March 7, 1950 V. L. COX 2,499,988
HARROW ATTACHMENT FOR PLOWS
Filed March 16, 1948 2 Sheets-Sheet 1

FIG. 1

Inventor:
Virgil L. Cox,

By *a. Ponack*

Attorney

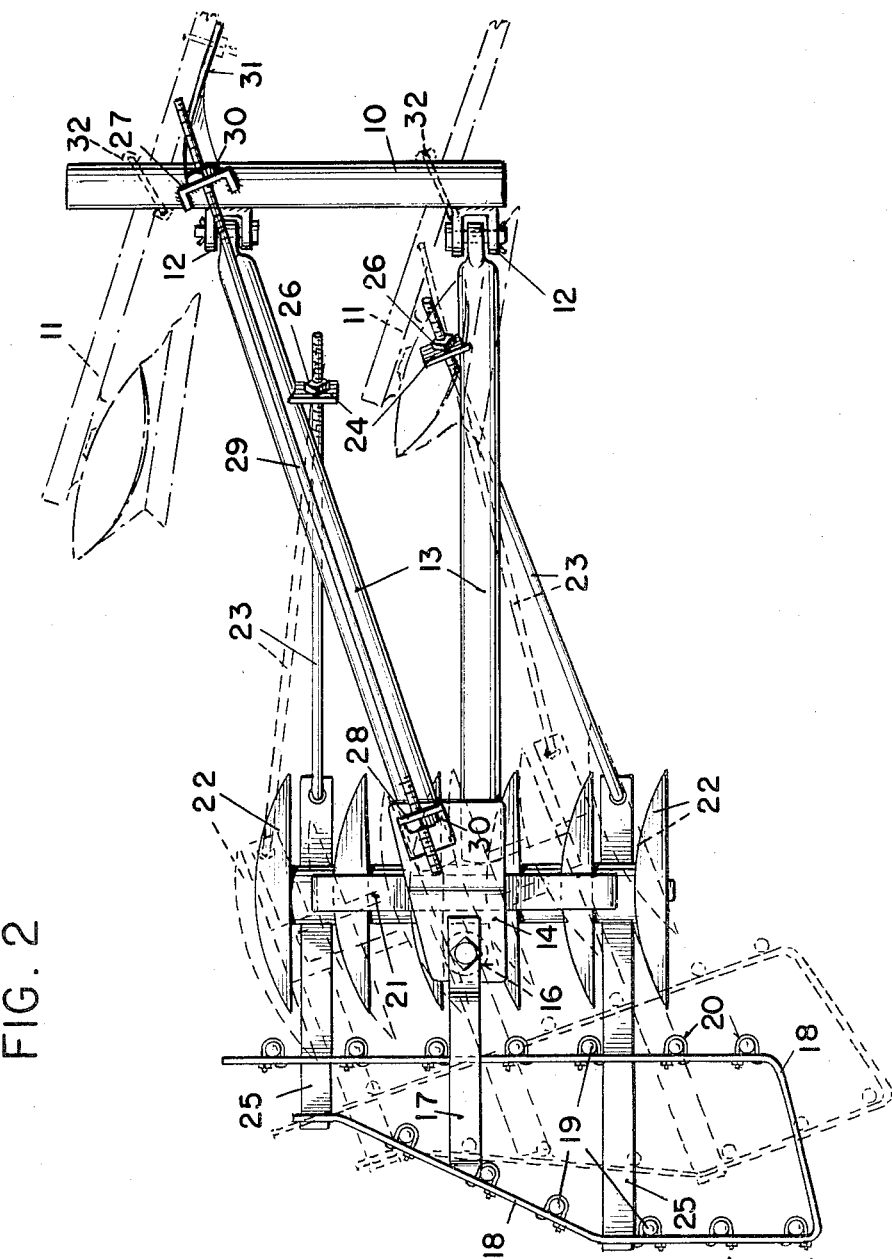

Patented Mar. 7, 1950

2,499,988

UNITED STATES PATENT OFFICE 2,499,988

HARROW ATTACHMENT FOR PLOWS

Virgil L. Cox, Ashland, Ohio

Application March 16, 1948, Serial No. 15,083

1 Claim. (Cl. 97—5)

The present invention relates to a new and improved attachment for plows and the like agricultural machines.

It is old to join a plurality of agricultural machines, such as a plow and various fitting implements, in conventional articulated tandem arrangement. In such arrangements, however, except for the fact that the several machines are driven simultaneously, they are essentially independent of each other. Thus, when the plow beams, for example, are raised to avoid an obstruction or obstacle, the trailing machines remain on the ground and have to be independently and severally manipulated to get around or over the obstacle.

A primary object of the present invention is the embodiment of an attachment which, while retaining the several advantages of the aforedescribed known tandem type of arrangement, is free of the disadvantages and deficiencies thereof.

Briefly stated, this object is realized, according to the invention, by the provision of a relationship of parts whereby an assembly of the socalled auxiliary or secondary machines which are to be associated with the primary machine, generally a plow or the like, is in effect integrated with the latter so that, in addition to the feature of being simultaneously driven from a single source of power (tractor or the like), certain ones at least of their other movements are simultaneously achieved. Thus, in the case of a plow for instance, the lifting of the plow beams—as when it is desired to avoid a rock or the like—will also simultaneously result in a lifting of all the attached equipment. A feature of the construction according to the invention, however, is that, notwithstanding the aforesaid integration, all of the individual machines are capable of independent adjustment, whereby great flexibility in operation is achieved.

Other objects and advantages of the invention will be manifest from the following detailed description, with reference to the accompanying sheets of drawing, of a presently preferred construction of attachment according to the invention.

On the said sheets of drawing,

Fig. 1 shows a perspective view of the attachment according to the present invention, and Fig. 2 is a top plan view of the said attachment, juxtaposed parts of an associated plow being shown in broken lines.

Referring to the said figures of drawing, reference numeral 10 designates a cross-beam whereby the unique feature of the present invention, namely, the integration of the attachment with an associated agricultural machine, such as a plow or the like, the beams 11 of which are indicated in broken lines in Fig. 2 of the drawings, is accomplished. While in the illustrated preferred embodiment of the invention, the cross-beam 10 assumes the form of a length of steel tubing, it is manifest that it may assume other structural forms such as that of I-beam, channel member or the like. Actual fastening of the cross-beam 10 to the plow beams 11 may advantageously be realized with the aid of U-bolts 32 or the like, whereby the said beams are effectively and rigidly integrated.

Extending rearwardly from the cross-beam 10 are spaced hinge members 12 which are welded or otherwise joined to the cross-beam 10. These hinge members 12 afford a hinge connection between the latter and the draw-bar 13. The latter is advantageously constructed in the form of a V, the legs of which are preferably also made of steel tubing, the vertex-forming ends being joined together, by welding or the like, through the medium of upper and lower steel plate members 14 and 15 (Fig. 1). This draw-bar arrangement—the V being a deformed V, as shown more particularly in Fig. 2, one of the legs being longer than the other—assures resistance to lateral displacement of the attachment. The draw-bar 13 may, of course, also be constructed of I-beams, channel beams or other structural members. Moreover, it is also possible to have a single bar or parallel bars, etc. extending back from the cross-beam 10 to the swivel joint 16. The latter is of the pin-and-sleeve type, the sleeve being integrally associated with the plates 14 and 15 (Fig. 1) and the pin being operatively connected to the projecting upper and lower arms 17 of the spike frame assembly 18.

The spike frame assembly 18, being per se no part of the present invention, may be of any desirable and/or conventional construction. As shown, it may consist essentially of a frame to which spikes 19 or the like are affixed by means of U-clamp and bolt devices 20.

The end of the lower arm 17 of the assembly 18 is preferably united, as by welding, to the top of an arch member 21, the downwardly-extending ends of which are associated with the bearings (not shown) of the disc assembly 22, which may also be of any desirable and/or conventional specific construction.

Tie rods 23, extending from lugs 24 provided on the sides of the draw-bar 13 to side bars 25 which are welded to the assembly frame 18, constitute means for varying the position of the spike and disk assemblies relative to the plow. These parts are retained in adjusted position with the aid of nuts 26 mounted on the thread ends of rods 23 and bearing against the lugs 24.

Fixedly secured to the cross-beam 13 and disposed in vertically upstanding position relative thereto is a channel iron 27. A correlatedly upstanding lug 28 is fixedly provided on the top of upper plate 17, as shown in both Figs. 1 and 2. Extending through suitable openings provided for this purpose in the channel iron 27 and in the lug 28 is the elevator rod 29. The ends of this rod may be threaded and nuts 30 provided thereon and arranged in abutting relationship with the remote sides of the parts 27 and 28, respectively.

Finally, a tie strap 31 may also be provided, and this may extend from the iron 27 to any adjacent part of the associated plow or other machine, the purpose being merely to assist in integrating the devices.

In operation, it is evident that when the plow beams 11 are raised by the machine operator in the usual way, the complete fitting device consisting of spike frame assembly and disc assembly is also raised. This is made possible by the rigid manner in which the parts are joined together through the medium of the U-bolts 32 (which interconnect the cross-beam and plow beams), the tie strap 31 and the elevator rod 29—a large portion of the weight being borne by the latter when the device is in raised position.

The elevator rod construction also enables a vertical adjustment of the fitting devices 18 and 22 to be realized, it merely being necessary to change the position of the nuts 30 thereon. The hinge members 12 permit this vertical adjustment to take place without affecting the adjustment of the plow beams 11.

The arrangement of tie rods 23, bars 25, arms 17 and swivel joint 16 make it possible to effect an angular adjustment of the fitting devices 18 and 22, by the simple expedient of adjusting the nuts 26. Here again, this adjustment may be made without in any way disturbing the position or adjustment of the plow beams.

It is manifest also that the disc and/or spike assemblies may be replaced by other fitting implements (springtooth, etc.) without departing from the principle of the invention.

The invention thus provides a relationship of parts whereby the enumerated objects are realized. The principally unique feature is the essential integration of the auxiliary fittings with the primary plow. Additional features are the ease with which the entire assembly can be manipulated. By simply raising the plow beams, all the associated fittings are also raised. The operator can thus readily avoid obstacles; moreover, he can back up with both plow beams and associated fittings in raised position, whereby he is unable to maneuver into and operate in the corners of fields and similar inaccessible areas. Furthermore, in addition to the fixed position of the fittings relative to the plow when raised, the parts possess the requisite independent, but correlatable flexibility in relation to the earth surface while in operation.

Having thus disclosed the invention, what is claimed is:

A fitting attachment for a plow or the like having beams, comprising a cross-beam, a draw-bar, and working elements; a connection for operatively integrating the fitting and plow whereby when the latter is raised the fitting is simultaneously raised; and means for adjusting the position of the working elements of the fitting relative to the surface of the earth and relative to the plow in the operating positions of the plow and fitting; the means for adjusting the position of the working elements of the fitting relative to the surface of the earth comprising a horizontally hinged connection between the said cross-beam and the remainder of the fitting, a threaded rod extending between said cross-beam and the remainder of the fitting, and nuts mounted on said threaded rod and adjustable thereon to alter the effective length of said rod between the cross-beam and the remainder of the fitting; and the means for adjusting the position of the working elements of the fitting relative to the plow in the operating positions of the plow and fitting comprising a frame carrying the working elements, a vertical pivotal connection between said frame and said draw-bar, threaded rods extending between said frame and draw-bar, and nuts mounted on said last-named threaded rods and adjustable thereon to alter the effective lengths of said rods between the frame and draw-bar.

VIRGIL L. COX.

REFERENCES CITED

The following references are of record in the file of this patent:

UNITED STATES PATENTS

| Number | Name | Date |
| --- | --- | --- |
| 1,751,158 | Jess | Mar. 18, 1930 |
| 2,414,114 | Martin | Jan. 14, 1947 |
| 2,431,959 | Olson et al. | Dec. 2, 1947 |